(12) United States Patent
Chung et al.

(10) Patent No.: US 10,099,510 B2
(45) Date of Patent: *Oct. 16, 2018

(54) DIRECT BOLT SIMULATED CAP

(71) Applicant: Design Infini, Inc., Corona, CA (US)

(72) Inventors: Suny Chung, Corona, CA (US); Myles Kovacs, Corona, CA (US)

(73) Assignee: Design Infini, Inc., Corona, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/659,157

(22) Filed: Jul. 25, 2017

(65) Prior Publication Data

US 2018/0009259 A1 Jan. 11, 2018

Related U.S. Application Data

(63) Continuation of application No. 15/240,403, filed on Aug. 18, 2016, now Pat. No. 9,744,806, which is a continuation of application No. 14/052,634, filed on Oct. 11, 2013, now Pat. No. 9,428,004.

(60) Provisional application No. 61/713,282, filed on Oct. 12, 2012.

(51) Int. Cl.
| | |
|---|---|
| *B60B 27/06* | (2006.01) |
| *B60B 3/00* | (2006.01) |
| *B60B 7/00* | (2006.01) |
| *B60B 7/06* | (2006.01) |
| *B60B 1/06* | (2006.01) |

(52) U.S. Cl.
CPC ............. *B60B 27/065* (2013.01); *B60B 1/06* (2013.01); *B60B 3/008* (2013.01); *B60B 7/0013* (2013.01); *B60B 7/066* (2013.01); *Y10T 29/49533* (2015.01)

(58) Field of Classification Search
CPC ........... B60B 7/002; B60B 3/16; B60B 7/068; B60B 3/00; B60B 3/008; B60B 7/006; B60B 7/70013
USPC ... 301/108.4, 37.372, 37.373, 37.376, 108.1, 301/108.2, 112, 120, 122
See application file for complete search history.

(56) References Cited

U.S. PATENT DOCUMENTS

| | | | |
|---|---|---|---|
| 5,078,453 | A | 1/1992 | Siwek |
| 5,820,225 | A * | 10/1998 | Ferriss ................. B60B 7/0013 301/37.105 |
| 6,419,327 | B1 | 7/2002 | Renshaw |
| 6,626,502 | B1 | 9/2003 | Petrak |
| 7,210,748 | B1 | 5/2007 | Velazquez |
| 7,287,819 | B2 | 10/2007 | McNeil |
| 8,677,623 | B1 | 3/2014 | Rayburn |
| 2005/0099057 | A1 | 5/2005 | Cutcher |
| 2007/0210640 | A1 | 9/2007 | Rogers |
| 2010/0013294 | A1 | 1/2010 | Chan |

(Continued)

*Primary Examiner* — S. Joseph Morano
*Assistant Examiner* — Jean W Charleston
(74) *Attorney, Agent, or Firm* — Knobbe, Martens, Olson & Bear, LLP

(57) ABSTRACT

A cap configured to be connected to a wheel having a hub and a series of openings configured to receive fasteners attaching the wheel to a vehicle. The cap includes a disc defining a series of openings. The number of openings in the cap is less than the number of openings in the wheel. Each opening in the cap is configured to align with a corresponding opening in the wheel. Additionally, the cap is configured to conceal a remainder of the openings in the wheel that are not aligned with the openings in the cap.

20 Claims, 4 Drawing Sheets

(56) References Cited

U.S. PATENT DOCUMENTS

2010/0194181 A1* 8/2010 Noriega .................... B60B 1/06
301/37.26
2013/0106169 A1* 5/2013 Chu ...................... B60B 7/0013
301/108.1

* cited by examiner

DIRECT BOLT SIMULATED CAP

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57 in their entirety and should be considered a part of this specification.

BACKGROUND

Field

The present invention relates generally to automotive wheel accessories and, more particularly, to a cap configured to connect to an existing automotive wheel.

Description of the Related Art

Wheeled vehicles commonly include wheel hub assemblies that are rotatably coupled to the vehicle's axles and threaded wheel studs protruding outward from wheel hub assemblies. The threaded wheel studs are configured to facilitate the attachment of wheels to the wheel hub assemblies. In particular, wheels commonly include a series of openings corresponding to the threaded wheel studs on the wheel hub assemblies such that the wheels may be slid onto the threaded wheel studs. Once the threaded wheel studs are received in the openings, the wheels may be secured to the wheel hub assemblies by a series of lug nuts screwed onto ends of the threaded wheel studs. Alternatively, the wheel hub assemblies may include a series of threaded holes and the wheels may be secured to the wheel hub assemblies of the vehicle by a series of lug bolts extending through the openings in the wheels and into the threaded holes in the wheel hub assemblies. Additionally, wheels also commonly include a center bore for receiving a hub protruding outward from the wheel hub assembly.

The number of threaded wheel studs or threaded holes in each wheel hub assembly typically varies depending upon the type of vehicle. For instance, custom-built high performance vehicles, commonly referred to as tuner vehicles, typically include eight to ten threaded wheel studs or threaded holes. In contrast, many luxury automobiles include only four or five wheel studs or threaded holes. Accordingly, the number of openings in the wheel typically varies based upon the type of vehicle on which the wheel is designed to be installed (e.g., wheels designed for luxury vehicles typically have four or five openings, which corresponds to the number of threaded studs or holes in the wheel hub assembly). Thus, a user's potential choice of wheels is typically limited to those wheels that have the appropriate number of openings. Alternatively, the user could purchase replacement wheel hub assemblies having the appropriate number of threaded wheel studs or threaded holes based upon the user's wheel selection. For instance, a user who desires to switch between tuner-style wheels and luxury wheels conventionally purchases two different sets of wheels and two different sets of wheel hub assemblies. However, purchasing two different sets of wheels and corresponding wheel hub assemblies, and storing the set not currently installed on the user's vehicle, is costly and inconvenient. Moreover, removing and replacing the vehicle's wheels and wheel hub assemblies is both time consuming and cumbersome.

SUMMARY

The present disclosure is directed to various embodiments of a cap configured to be detachably connected to an automotive wheel having a hub and a first plurality of openings configured to receive fasteners attaching the wheel to a vehicle. In one embodiment, the cap includes a disc defining a second plurality of openings. The number of openings in the second plurality of openings is less than the number of openings in the first plurality of openings. Additionally, each of the second plurality of openings is configured to align with a corresponding one of the openings of the first plurality of openings in the wheel. The disc is also configured to conceal a remainder of the openings of the first plurality of openings in the wheel.

In one embodiment, the disc further also includes an inner surface configured to conform to a portion of the hub of the wheel. In one embodiment, the first plurality of openings in the wheel includes from eight to ten openings and the second plurality of openings in the cap includes from four to six openings. In one embodiment, the openings of the second plurality of openings are circumferentially disposed around the disc. In one embodiment, a shape and size of each of the openings of the second plurality of openings substantially matches a shape and size of the corresponding one of the openings of the first plurality of openings. In one embodiment, the disc further includes a central opening configured to receive a hub cover on the wheel. In one embodiment, the cap includes a plurality of holes circumferentially disposed around the central opening. Each hole of the plurality of holes is configured to receive a fastener coupling the cap to the wheel. In one embodiment, each of the openings in the cap is non-circular. In one embodiment, the cap also includes at least one simulated bolt head in an outer surface of the disc.

The present disclosure is also directed to various embodiments of a wheel assembly. In one embodiment, the wheel assembly includes a wheel having a hub and a first plurality of openings in the hub. Each opening of the first plurality of openings is configured to receive a fastener coupling the wheel to a vehicle. The wheel assembly also includes a cap detachably coupled to the hub of the wheel. The cap defines a second plurality of openings. Each opening of the second plurality of openings is configured to receive a corresponding one of the fasteners coupling the wheel to the vehicle. The number of openings in the cap is less than the number of openings in the wheel. Each opening in the cap is aligned with a corresponding one of the openings in the wheel. Additionally, the cap covers a remainder of the openings in the wheel. The wheel assembly also includes plurality of fasteners extending through the second plurality of openings in the cap and the corresponding openings in the wheel to couple the wheel to a vehicle. In one embodiment, the wheel assembly also includes a plurality of holes in the cap and a plurality of fasteners extending through the plurality of holes in the cap and into the wheel to couple the cap to the wheel. In one embodiment, the wheel assembly also includes a center bore defined in the wheel, a cover coupled to one end of the center bore, and a central opening in the cap. In one embodiment, the central opening in the cap is concentric with the cover on the wheel.

The present disclosure is also directed to various methods of reducing an effective number of openings in a wheel configured to receive fasteners coupling the wheel to a vehicle. In one embodiment, the method includes detachably coupling a cap to the wheel. The cap includes a plurality of openings aligned with a corresponding plurality of openings in the wheel. The cap also covers at least one unused opening in the wheel. In one embodiment, the method also includes installing a plurality of fasteners through the plurality of openings in the cap and the corresponding plurality of openings in the wheel to couple the wheel to the vehicle. In one embodiment, coupling the cap to the wheel includes forming a plurality of holes in a hub of the wheel and installing a plurality of fasteners through a plurality of holes in the cap and into the plurality of holes in the hub of the wheel. In one embodiment, coupling the cap to the wheel includes positioning a central opening in the cap on a cover on the wheel. In one embodiment, the method also includes detaching the cap from the wheel to expose the at least one unused opening in the wheel and installing at least one fastener through the at least one unused opening in wheel.

This summary is provided to introduce a selection of concepts that are further described below in the detailed description. This summary is not intended to identify key or essential features of the claimed subject matter, nor is it intended to be used in limiting the scope of the claimed subject matter.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

Figure 1:
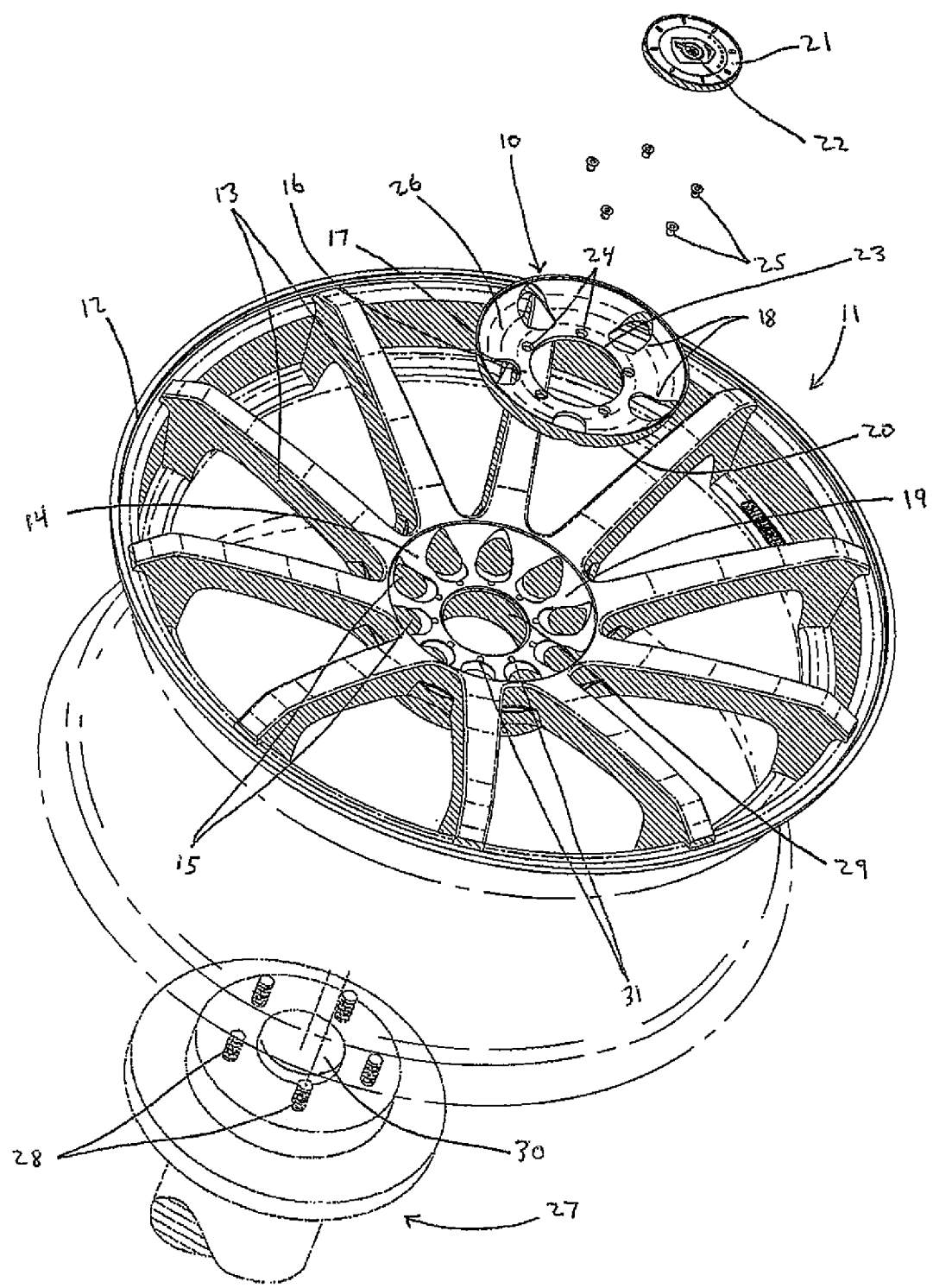
FIG. 1 is an exploded perspective view of a cap according to one embodiment of the present disclosure and an automotive wheel.

The present disclosure is directed to various embodiments of a cap 10 configured to be detachably connected to an automotive wheel 11. In the embodiment illustrated in FIG. 1, the automotive wheel 11 includes a rim 12, a plurality of spokes 13 extending radially inward from the rim 12, a hub 14 disposed at a center-point of the spokes 13, and a plurality of openings 15 in the hub 14. As used herein, the term "plurality" shall mean two or more, unless expressly stated otherwise. The openings 15 in the hub 14 are configured to receive a plurality of fasteners (e.g., threaded studs or threaded lugs) coupling the wheel 11 to a wheel hub assembly 27 on a vehicle. The cap 10 is configured to reduce the effective number of openings 15 in the wheel 11 that are configured to receive fasteners coupling the wheel 11 to the wheel hub assembly 27 on the vehicle.

According to one embodiment, the caps 10 are configured to expand a user's potential selection of wheels 11 because the user is not limited to wheels 11 having a number of openings 15 that corresponds to the number of threaded studs 28 or threaded openings on the wheel hub assembly 27. For instance, the user may select a wheel 11 having a number of openings 15 that exceeds the number of threaded studs 28 or threaded holes on the wheel hub assembly 27. According to one embodiment, the cap 10 may be used to reduce the number of effective openings 15 in the wheel 11 so that the number of effective openings 15 in the wheel 11 matches the number of threaded studs 28 or threaded openings on the wheel hub assembly 27. Alternatively, the user may select a wheel 11 having a number of openings 15 that equals the number of threaded studs 28 or threaded holes on the wheel hub assembly 27. The cap 10 may be used reduce the effective number of openings 15 in the wheel 11 so that one or more of the threaded studs 28 or threaded holes on the wheel hub assembly 27 go unused. The cap 10 is also configured to eliminate the need to purchase two different wheels and two different corresponding wheel hub assemblies based upon the desired number of fasteners securing the wheels to the wheel hub assemblies. Furthermore, the cap 10 is configured to dynamically change the style of the wheels, such as between tuner-style wheels and luxury-style wheels.

Figure 2:
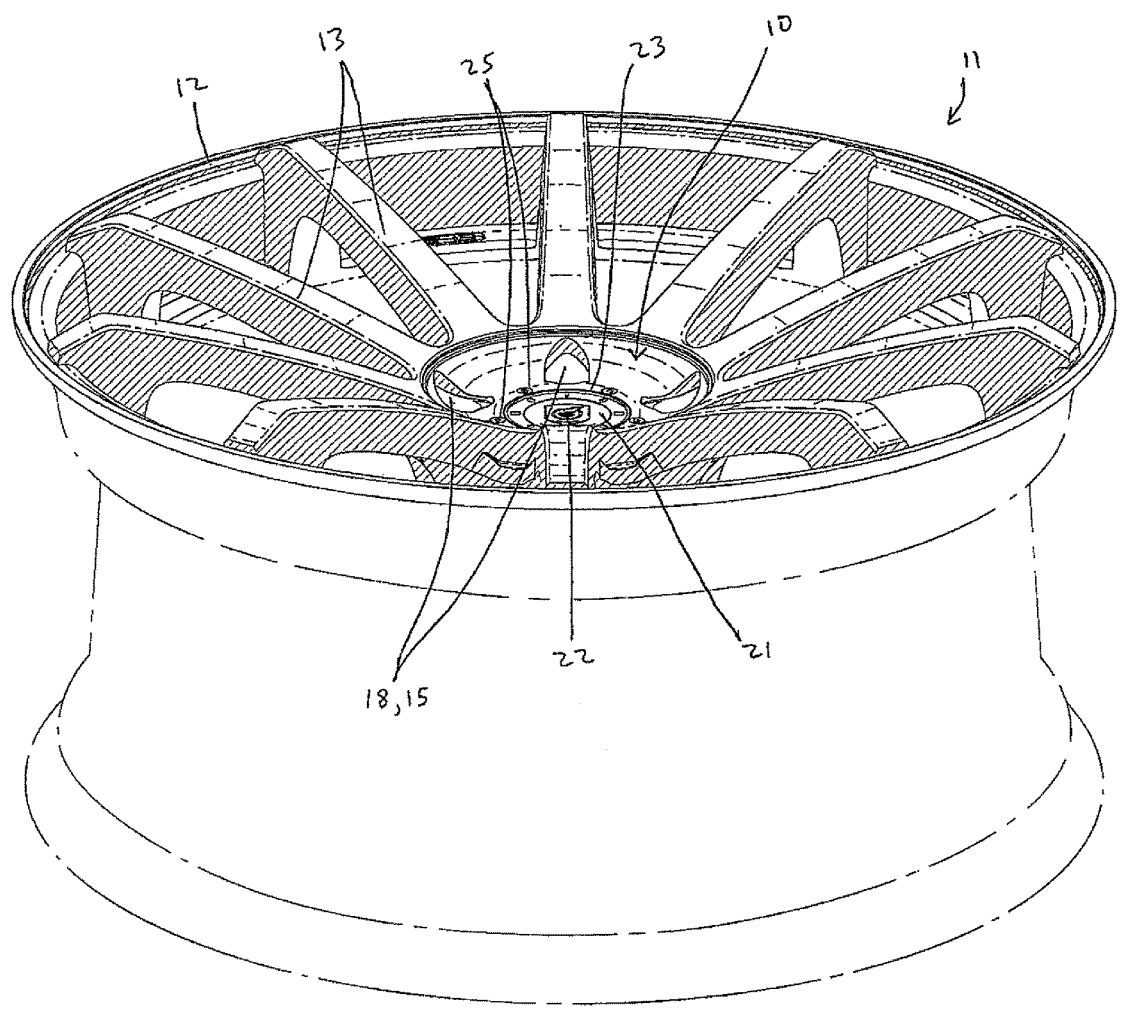
FIG. 2 is a perspective view of the cap according to FIG. 1 detachably connected to the automotive wheel.
Figure 3:
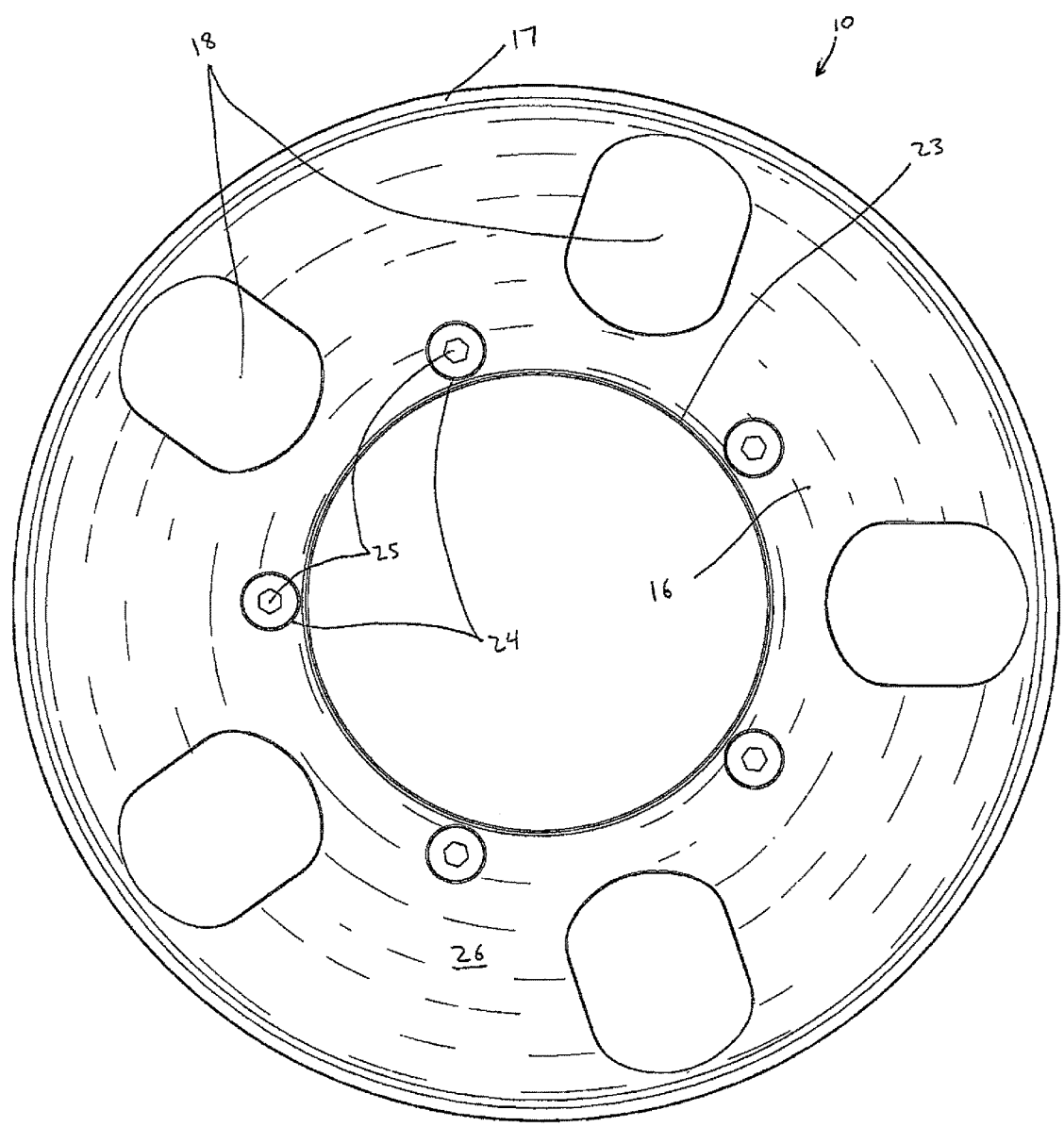
FIG. 3 is a front view of the cap according to FIG. 1.

With reference now to the embodiment illustrated in FIGS. 1 through 3, the cap 10 is a disc having a base 16 and a flange or lip 17 extending around a periphery of the base 16. According to one embodiment, the base 16 of the cap 10 is flat or otherwise mirrors a portion of the hub 14 and the lip 17 of the cap 10 is upturned or otherwise mirrors a portion of the hub 14. The cap 10 also defines a plurality of circumferentially disposed openings 18. In the illustrated embodiment, the wheel 11 includes ten openings 15 and the cap 10 defines five openings 18. A person of ordinary skill in the art should realize, however, that the cap 10 may define any other desired number of openings 18, such as from two to ten, and still fall within the scope and spirit of the present disclosure.

Each of the openings 18 in the cap 10 is configured to align with one of the openings 15 in the wheel 11. According to one embodiment, when the cap 10 is coupled to the wheel 11, each opening 18 in the cap 10 is aligned with one corresponding opening 15 in the hub 14 of the wheel 11. The openings 15 in the wheel 11 that are aligned with the openings 18 in the cap 10 are configured to receive the fasteners (e.g., a threaded stud 28 and a lug nut or a threaded lug) coupling the wheel 11 to the vehicle. The remaining openings 15 in the wheel 11 are unused when the cap 10 is coupled to the wheel 11. According to one embodiment, the openings 15 in the wheel 11 that are not aligned with the openings 18 in the cap 10 are configured not to receive a fastener coupling the wheel 11 to the vehicle. Additionally, the cap 10 is configured to cover and conceal the unused openings 15 in the wheel 11. In the illustrated embodiment, each of the openings 18 in the cap 10 has substantially the same size and shape as the openings 15 in the wheel 11, although the openings 18 in the cap may have a different shape and/or size than the openings 15 in the wheel 11. Additionally, openings 15, 18 in the wheel 11 and the cap 10, respectively, may be either circular or non-circular. The openings in the cap 10 are also configured to facilitate installation and removal of the fasteners coupling the wheel 11 to the vehicle. Accordingly, the wheel 11 may be attached and detached from the wheel hub assembly 27 of the vehicle even when the cap 10 is coupled to the wheel 11.

With continued reference to the embodiment illustrated in FIGS. 1 and 2, the hub 14 of the wheel 11 includes an outer recessed surface 19. As illustrated in FIG. 2, the cap 10 is configured to be seated in the outer recessed surface 19 of the wheel 11. Additionally, an inner surface 20 of the cap 10 is configured to rest flush against at least a portion of the outer recessed surface 19 of the hub 14 of the wheel 11 when the cap 10 is detachably coupled to the wheel 11. According to one embodiment, the inner surface 20 of the cap 10 matches the contour of the outer recessed surface 19 of the hub 14 of the wheel 11. In one or more other embodiments, however, the inner surface 20 of the cap 10 may not conform to the outer recessed surface 19 of the hub 14 and/or may be spaced apart from the outer recessed surface 19 of the hub 14. Additionally, the inner surface 20 of the cap 10 may have any suitable contour depending upon the configuration of the hub 14 of the wheel 11. For instance, in one embodiment, the hub 14 of the wheel 11 may have a convex outer surface and the inner surface 20 of the cap 10 may have a concave shape configured to match the convex outer surface of the hub 14. According to one embodiment, the cap 10 and the wheel 11 together are configured to give the impression of a single, unitary piece.

With continued reference to the embodiment illustrated in FIGS. 1 and 2, the wheel 11 includes a central bore 29 configured to receive a hub 30 on the wheel hub assembly 27. The central bore 29 is configured to support the wheel 11 on the wheel hub assembly 27. According to one embodiment, the wheel 11 also includes a cover 21 disposed on an outer end of the central bore 29. The cover 21 may include various indicia 22, such as ornamentation and/or a decal, logo, or other badging identifying, for example, the manufacturer of the wheel 11. Additionally, in the illustrated embodiment, the cap 10 includes a central opening 23 configured to receive the cover 21 on the wheel 11. According to one embodiment, the cover 21 on the wheel 11 is configured to protrude into the central opening 23 in the cap 10 when the cap 10 is detachably coupled to the wheel 11. According to this embodiment, the central opening 23 in the cap 10 is configured to expose or reveal the indicia 22 on the cover 21. For example, the cap 10 is configured not to obstruct a user's view of the indicia 22 on the cover 21. In one embodiment, the shape and size of the central opening 23 in the cap 10 substantially matches the shape and size of the cover 21 on the wheel 11. In another embodiment, the shape and size of the central opening 23 in the cap 10 may differ from the shape and/or size of the cover 21 on the wheel 11. Additionally, in one or more embodiments, the cap 10 may be provided without a central opening 23 so that the cap 10 is configured to cover and conceal any indicia 22 on the cover 21 of the wheel 11.

Still referring to the embodiment illustrated in FIGS. 1 and 2, the cap 10 also includes a plurality of holes 24 circumferentially disposed around the central opening 23. In the illustrated embodiment, the cap 10 includes five holes 24, although the cap 10 may include any other suitable number of holes 24, such as, for instance, from one to ten holes 24, and still fall within the scope and spirit of the present disclosure. The holes 24 in the cap 10 are configured to receive fasteners 25 (e.g., hex head screws) detachably coupling the cap 10 to the wheel 11. In one or more embodiments, the cap 10 may be provided without the holes 24, and the cap 10 may be detachably coupled to the wheel 11 by any other suitable means, such as, for instance, removable adhesive. Although in the illustrated embodiment the number of holes 24 matches the number of openings 18 in the cap 10, in one or more embodiments, the number of holes 24 may differ from the number of openings 18 in the cap 10. Additionally, although the holes 24 in the embodiment illustrated in FIGS. 1 and 2 are circumferentially disposed between the openings 18 in the cap 10 (e.g., the holes 24 are disposed between adjacent openings 18 in the cap 10), the holes 24 may be positioned at any other suitable locations on the cap 10, such as, for instance, aligned with the openings 18 in the cap 10.

In one embodiment, the cap 10 may also include at least one simulated fastener head (not shown) formed in an outer surface 26 of the cap 10. Each simulated fastener head includes a series of depressions in the outer surface 26 of the cap 10 arranged to emulate the appearance of a fastener head, such as, for instance, the appearance of a head of a hex head screw. In one embodiment, each simulated fastener head may be configured to emulate the appearance of the head of the fasteners 25 detachably coupling the cap 10 to the wheel 11. In another embodiment, each simulated fastener head may emulate the appearance of a fastener that is different from the type of fasteners 25 detachably coupling the cap 10 to the wheel 11. In one embodiment, two of the five holes 24 circumferentially disposed around the central opening 23 may be replaced by two simulated fastener heads, although any number of the holes 24 may be replaced by simulated fastener heads and still fall within the scope and spirit of the present disclosure. In one embodiment, each of the holes 24 in the cap 10 may be replaced by simulated fastener heads and the cap 10 may be detachably connected to the wheel 11 by any suitable means other than mechanical fastening, such as, for instance, removable adhesive. The simulated fastener heads may aid in deterring theft of the cap 10 by obfuscating the proper mechanism for detaching the cap 10 from the wheel 11.

The cap 10 may be made of any suitably strong and durable material, such as, for instance, metal (e.g., aluminum or steel), metal alloy (e.g., aluminum alloys), or carbon fiber reinforced plastic. The cap 10 may be made by any suitable process, such as, for instance, machining, milling, water jet cutting, laser cutting, stamping, pressing, sheet metal drawing, molding, rapid prototyping using additive manufacturing techniques, or any combination thereof.

Figure 4:
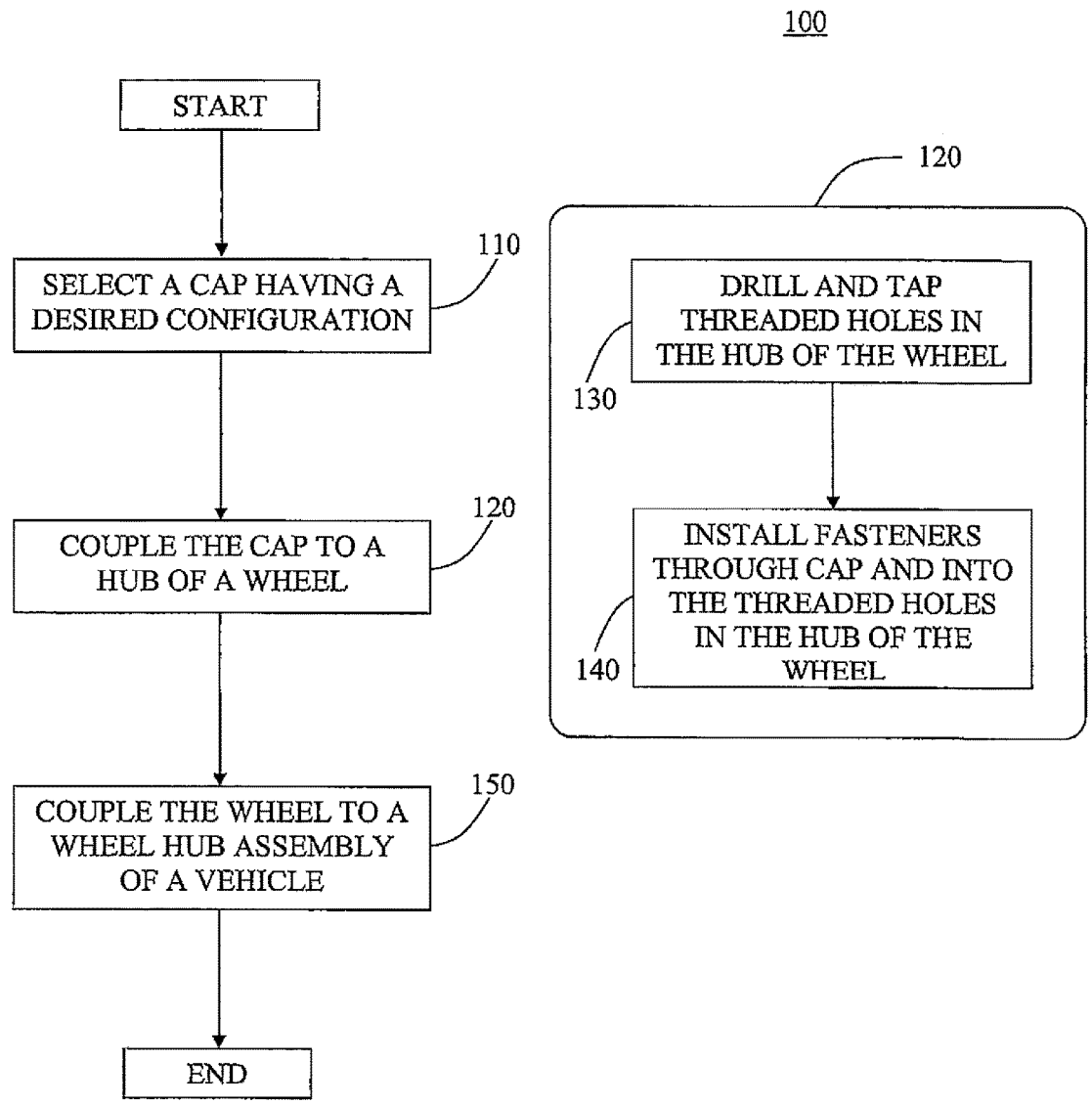
FIG. 4 is a flowchart illustrating steps of installing a cap on a wheel according to one embodiment of the present disclosure.

FIG. 4 is a flow diagram of a method 100 of using the cap 10 according to one embodiment of the present disclosure. In one embodiment, the method 100 includes a task 110 of selecting a cap 10 having a desired configuration. The desired configuration of the cap 10 may depend upon the number of openings 15 in the wheel 11 to which the cap 10 will be installed, the number of threaded wheel studs 28 or threaded holes in the wheel hub assembly 27, and the desired number of fasteners coupling the wheel 11 to the wheel hub assembly. For instance, in one embodiment in which the wheel 11 defines from eight to ten openings 15, the user may select a cap 10 defining four or five openings 18 such that the effective number of openings 15 in the wheel 11 that are configured to receive fasteners coupling the wheel 11 to the wheel hub assembly 27 is reduced to four or five openings 15.

The method 100 also includes a task 120 of coupling the cap 10 to the hub 14 of the wheel 11. In one embodiment, the task 120 of coupling the cap 10 to the hub 14 of the wheel 11 includes a task 130 of drilling and tapping a plurality of threaded blind holes 31 (see FIG. 1) in the hub 14 of the wheel 11 that are arranged to align with the plurality of holes 24 in the cap 10. The task 120 of coupling the cap 10 to the hub 14 of the wheel 11 also includes a task 140 of installing a plurality of fasteners 25, such as, for instance, hex head screws, by inserting the fasteners 25 into the plurality of holes 24 in the cap 10 and then threading the fasteners 25 into the threaded blind holes 31 in the hub 14 of the wheel 11.

In another embodiment, the holes 31 in the hub 14 of the wheel 11 may be smooth blind bores and the fasteners 25 coupling the cap 10 to the wheel 11 may be self-tapping fasteners, such as, for instance, self-tapping screws. Additionally, in one or more other embodiments, the task 120 of coupling the cap 10 to the wheel 11 may include permanently coupling the cap 10 to the wheel 11 by permanent fasteners, such as, for instance, rivets. In another embodiment, the task 120 of coupling the cap 10 to the wheel 11 may include permanently connecting the cap 10 to the wheel 11 by any other suitable means, such as, for instance, bonding, welding, or brazing. In one embodiment, the method 100 may also include a task 150 of coupling the wheel 11 to the wheel hub assembly 27 on the vehicle by installing the fasteners (e.g., lug nuts or threaded lugs).

While in one embodiment, the method 100 of using the caps 10 may include each of the tasks described above and shown in FIG. 4, in other embodiments of the present disclosure, one or more of the tasks described above and shown in FIG. 4 may be absent and/or additional tasks may be performed. Furthermore, in the method 100 of using the cap 10 according to one embodiment, the tasks may be performed in the order depicted in FIG. 4. However, the present disclosure is not limited thereto and, in a method 100 of using the cap 10 according to other embodiments of the present disclosure, the tasks described above and shown in FIG. 4 may be performed in any other suitable sequence. For instance, in one embodiment, the task 120 of coupling the cap 10 to the wheel 11 may be performed before the task 150 of coupling the wheel 11 to the wheel hub assembly 27 on the vehicle, while in another embodiment, the task 150 of coupling the wheel 11 to the wheel hub assembly 27 may be performed before the task 120 of coupling the cap 10 to the wheel 11.

While this invention has been described in detail with particular references to exemplary embodiments thereof, the exemplary embodiments described are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," "below," "above," "vertical," "horizontal," and similar terms have been used herein to describe a spatial relationship of one element to another, it is understood that these terms are intended to encompass different orientations of the various elements and components of the invention in addition to the orientation depicted in the figures. Additionally, as used herein, the term "substantially" and similar terms are used as terms of approximation and not as terms of degree, and are intended to account for the inherent deviations in measured or calculated values that would be recognized by those of ordinary skill in the art.

What is claimed is:

1. An automobile wheel, comprising:
an outer rim;
a hub defined generally at the center of the automobile wheel, the hub having a recessed portion and a first plurality of openings;
a plurality of spokes extending radially between the outer rim and the hub; and
a cap configured to be removably disposed in the recessed portion of the hub of the automobile wheel so that the cap covers a subset of the first plurality of openings and leaves exposed the remaining first plurality of openings such that said remaining first plurality of openings receive a plurality of threaded studs of an automobile wheel hub assembly therein when the automobile wheel is mounted to the automobile.

2. The automobile wheel of claim 1, wherein at least portion of a bottom surface of the cap conforms to an outer surface of the recessed portion of the hub, wherein at least portion of the bottom surface of the cap contacts the outer surface of the recessed portion of the hub when the cap is disposed in the recessed portion of the hub.

3. The automobile wheel of claim 1, further comprising:
a plurality of holes in the cap; and
a plurality of fasteners extending through the plurality of holes and into the hub to couple the cap to the hub.

4. The automobile wheel of claim 1, further comprising:
a center bore defined in the wheel;
a cover coupled to one end of the center bore; and
a central opening in the cap, wherein the central opening is concentric with the cover on the wheel.

5. The automobile wheel of claim 1, wherein the cap has a second plurality of openings configured to be aligned with the remaining first plurality of openings and leave the remaining first plurality of openings exposed, wherein a shape and size of each of the openings of the second plurality of openings substantially matches a shape and size of the corresponding openings of said remaining first plurality of openings in the wheel.

6. The automobile wheel of claim 5, wherein each of the second plurality of openings is non-circular.

7. The automobile wheel of claim 1, wherein the cap is disc shaped.

8. The automobile wheel of claim 1, wherein the first plurality of openings are ten openings and said remaining first plurality of openings are five openings.

9. The automobile wheel of claim 1, wherein the cap sits flush in the recessed outer surface of the hub.

10. The automobile wheel of claim 1, wherein at least a portion of an outer perimeter of the cap conforms to a perimeter of the recessed outer surface of the hub.

11. An automobile wheel, comprising:
an outer rim;
a hub defined generally at the center of the automobile wheel, the hub having a recessed portion and a first plurality of lug holes; and
a cap configured to be at least partially disposed in the recessed portion of the hub of the automobile wheel so that the cap covers a subset of the first plurality of lug holes and leaves exposed the remaining first plurality of lug holes such that said remaining first plurality of lug holes are configured to receive a plurality of threaded studs of an automobile wheel hub assembly therein when the automobile wheel is mounted to the automobile.

12. The automobile wheel of claim 11, wherein at least portion of a bottom surface of the cap conforms to an outer surface of the recessed portion of the hub, wherein at least portion of the bottom surface of the cap contacts the outer surface of the recessed portion of the hub when the cap is disposed in the recessed portion of the hub.

13. The automobile wheel of claim 11, further comprising:
a plurality of holes in the cap; and
a plurality of fasteners extending through the plurality of holes and into the hub to couple the cap to the hub.

14. The automobile wheel of claim 11, further comprising:
a center bore defined in the wheel;
a cover coupled to one end of the center bore; and
a central opening in the cap, wherein the central opening is concentric with the cover on the wheel.

15. The automobile wheel of claim 11, wherein the cap has a second plurality of openings configured to be aligned with said remaining first plurality of lug holes and leave said remaining first plurality of lug holes exposed, wherein a shape and size of each of the openings of the second plurality of openings substantially matches a shape and size of the corresponding openings of said remaining first plurality of lug holes in the wheel.

16. The automobile wheel of claim 15, wherein each of the second plurality of openings is non-circular.

17. The automobile wheel of claim 11, wherein the cap is disc shaped.

18. The automobile wheel of claim 11, wherein the first plurality of lug holes are ten openings and said remaining first plurality of lug holes are five openings.

19. The automobile wheel of claim 11, wherein the cap sits flush in the recessed outer surface of the hub.

20. The automobile wheel of claim 11, wherein at least a portion of an outer perimeter of the cap conforms to a perimeter of the recessed outer surface of the hub.

* * * * *